United States Patent [19]

Mamantov et al.

[11] 3,966,491

[45] June 29, 1976

[54] MOLTEN SALT ELECTROCHEMICAL SYSTEMS FOR BATTERY APPLICATIONS

[75] Inventors: Gleb Mamantov, Knoxville, Tenn.; Roberto Marassi, Camerino, Italy; James Q. Chambers, Concord, Tenn.

[73] Assignee: The United States of America as represented by the Secretary of the Army, Washington, D.C.

[22] Filed: Feb. 13, 1975

[21] Appl. No.: 549,578

[52] U.S. Cl. .............................. 136/6 LF; 136/20; 136/83 T
[51] Int. Cl.² ........................................ H01M 10/00
[58] Field of Search .................. 136/6 LF, 83 T, 20

[56] References Cited
UNITED STATES PATENTS

| | | | |
|---|---|---|---|
| 3,554,806 | 1/1971 | Greenberg et al. | 136/83 T X |
| 3,573,986 | 8/1975 | Greenberg | 136/83 T |
| 3,751,298 | 8/1973 | Senderoff | 136/6 LF |
| 3,770,503 | 11/1973 | Brabson et al. | 136/6 LF |
| 3,811,947 | 5/1974 | Metcalfe et al. | 136/6 LF |
| 3,827,910 | 8/1974 | Cairns et al. | 136/6 LF |

*Primary Examiner*—John H. Mack
*Assistant Examiner*—C. F. Lefevour
*Attorney, Agent, or Firm*—Nathan Edelberg; Sheldon Kanars; Roy Gordon

[57] ABSTRACT

A molten salt electrochemical system for battery applications is provided comprising aluminum as the anode, positive oxidation states of either iodine or sulfur as the cathode, and a low-melting molten mixture of aluminum chloride and alkali chloride disposed between the anode and cathode and in contact with each.

6 Claims, No Drawings

MOLTEN SALT ELECTROCHEMICAL SYSTEMS FOR BATTERY APPLICATIONS

BACKGROUND OF THE INVENTION

This invention relates in general to molten salt electrochemical systems and in particular to such systems using molten chloroaluminate solvents that melt below 200°C, an aluminum metal anode and positive oxidation states of either iodine or sulfur as the active cathode material.

Present aqueous and organic electrolyte electrochemical systems do not have the high conductivity and power densities required in certain applications, as for example, in electric vehicles. Attempts have been made to use a molten salt electrolyte because of its high conductivity but these attempts have not been entirely satisfactory in that they have required a temperature above 350°C.

It has been suggested in the art that the molten salt electrochemical system could be improved by the use of a low melting molten chloroaluminate as for example, a mixture of $AlCl_3$ and NaCl as the electrolyte and solid aluminum as the anode. That is, the molten chloroaluminate has a low liquidus temperature and high conductivity while aluminum as the anode is of potential advantage since aluminum is relatively inexpensive and has a small equivalent weight. As the cathode for such a system, gaseous chlorine has been used to obtain high energy densities and reasonable EMF's of about 2 volts, but problems associated with the use of gaseous chlorine make such an electrochemical system less desirable. U.S. Pat. No. 3,573,986 issued Apr. 6, 1971 to Jacob Greenberg for "HEAT ACTIVATED CELL" teaches the use of elemental sulfur as the cathode for such an electrochemical system or battery but such a system is not satisfactory in that the EMF is 1.2 volts which is too low.

SUMMARY OF THE INVENTION

The general object of this invention is to provide a molten salt electrochemical system capable of delivering high energy densities at tempratures below 300°C. A further object of the invention is to provide such an electrochemical system wherein a suitable cathode material is coupled with a low melting molten chloroaluminate as the electrolyte and aluminum as the anode.

Such an electrochemical system has now been provided by using a cathode comprising the positive oxidation states of iodine or sulfur as the active cathode material.

By positive oxidation states of iodine is meant those iodine species where iodine has a positive oxidation state and of different stoichiometries as for example $ICl_2^-$, $I_3^+$, $I_5^+$, $I_2Cl^+$. The positive oxidation states of iodine may be obtained readily by anodization of an inert conductor, for example, tungsten or carbon, immersed in a chloroaluminate melt containing an iodide salt as for example, potassium iodide or iodine. One may also add compounds, such as $I_3AlCl_4$, $I_5AlCl_4$ and $I_2ClAlCl_4$, to the chloroaluminate melt.

By positive oxidation states of sulfur is meant those species of sulfur such as $S_2^{2+}$, $S_4^{2+}$, $S_8^{2+}$, or, in general, $S_n^{m+}$ where $n \geq 2$ and $m$ is typically 2. The positive oxidation states of sulfur may be obtained readily by anodization of an inert conductor immersed in a chloroaluminate melt containing elemental sulfur or a sulfide salt as for example, sodium sulfide. These positive oxidation states may also be obtained by adding compounds such as $SCl_2$, $S_2Cl_2$ and in general $S_mCl_2$ where $m \geq 1$.

The low melting chloroaluminate electrolyte melts below 200°C and is comprised of mixtures of 51 to 20 mole percent or 31.3 to 9.9 weight percent NaCl and 49 to 80 mole percent or 68.7 to 90.1 weight percent $AlCl_3$. Other alkali chlorides such as lithium or potassium chloride, may be used partly or completely in place of sodium chloride. The electrolyte may be prepared in a number of ways one of which is as follows: $AlCl_3$ is first sublimed through a medium porosity Pyrex frit in a sealed cell. The correct amount is then weighed in an argon filled dry box and mixed with the corresponding quantity of NaCl which has been purified by double crystallization from water and drying for 24 hours at 400°C under vacuum. The mixture is then melted in a container, sealed under vacuum in the presence of aluminum metal and kept at 200°C to 250°C until the melt is water-like.

DESCRIPTION OF THE PREFERRED EMBODIMENT

EXAMPLE 1

This example illustrates the use of the product of the electrochemical oxidation of sulfur as a cathode in a battery. A simple H-type cell is used. In the cathode compartment, a tungsten spiral having an area of about 1cm² serves as the current collector in a solution of molten chloroaluminate containing 0.5 gram of sulfur. In lieu of the tungsten spiral, a carbon crucible or rod can also be used. The anode is a spiral of aluminum in a solution of molten chloroaluminate. An additional compartment containing pure melt is present between the other two. The same melt composition of 49.8 mole percent or 69.36 weight percent $AlCl_3$ to 50.2 mole percent or 30.64 weight percent NaCl is used in all three compartments. The experimental temperature is 175°C. Two coarse Pyrex frits serve as separators. The central compartment is added to prevent diffusion and to avoid the problems associated with the dendrite formation during the charging cycle. The cell is charged by anodizing the tungsten spiral at constant current. Sulfur cations are produced both by direct oxidation at the electrode and chemically through the reaction of chlorine and sulfur. Upon charging, the solution in the cathode compartment turns green and then brown. The potential, as measured with respect to an external aluminum reference, rises from +1.1 volts to 2.2 volts. A discharge curve as measured at a discharge current density of 6 mA/cm² and obtained after charging at 30 milliamperes for 2 hours indicates that the cell voltage remains at an average value of 2.0 volts for about 40 minutes. When the current is cut off, the initial open circuit voltage of about 2.1 volts is rapidly recovered. It is further noted that an increase in the charging time causes an increased capacity of the cathode. That is, discharge curves with an average cell voltage of 2.0 volts are obtained with a current density of about 20 milliamperes per square centimeter for longer than one hour.

EXAMPLE 2

In this example, a cell is used with two compartments separated by a medium porosity Pyrex frit. In the cathode compartment, a large tungsten spiral or carbon conductor is dipped in a concentrated solution of sodium iodide in the chloroaluminate melt; $AlCl_3$—NaCl, 49.8–50.2 mole percent. In the other compartment, a larger aluminum electrode is dipped in the chloroaluminate melt saturated with sodium chloride. The experimental temperature is 175°C. Upon anodization of the tungsten spiral, $I_2$ and $I(+1)$ are formed, and the potential of the electrode is increased to progressively more positive potentials of about 1.9 volts.

We wish it to be understood that we do not desire to be limited to the exact details described, for obvious modifications will occur to a person skilled in the art.

What is claimed is:

1. An electrochemical system comprising an aluminum anode, a cathode spaced from said anode where said cathode comprises positive oxidation states of an element selected from the group consisting of sulfur and iodine and a low melting molten mixture of aluminum chloride and alkali chloride disposed between said anode and said cathode and in contact with each.

2. An electrochemical system according to claim 1 wherein the cathode comprises positive oxidation states of sulfur.

3. An electrochemical system according to claim 1 wherein the cathode comprises positive oxidation states of iodine.

4. An electrochemical system according to claim 1 wherein the low melting molten mixture is comprised of 51 to 20 mole percent NaCl and 49 to 80 mole percent $AlCl_3$.

5. An electrochemical system according to claim 1 wherein the cathode comprises positive oxidation states of sulfur and wherein the low melting molten mixture is comprises of 51 to 20 mole percent NaCl and 49 to 80 mole percent $AlCl_3$.

6. An electrochemical system according to claim 1 wherein the cathode comprises positive oxidation states of iodine and wherein the low melting molten mixture is comprises of 51 to 20 mole percent NaCl and 49 to 80 percent $AlCl_3$.

* * * * *